United States Patent [19]

Pirrung et al.

[11] Patent Number: 5,657,934
[45] Date of Patent: Aug. 19, 1997

[54] GRANULATING DEVICE FOR STRAND MATERIALS

[75] Inventors: Walter Pirrung, Grossostheim; Berthold Glaab, Hösbach; Laurenz Hohm, Grossostheim; Helmuth Meidhof, Grossostheim; Guenther Wolf, Grossostheim, all of Germany

[73] Assignee: Rieter Automatik GmbH, Grossostheim, Germany

[21] Appl. No.: 407,707

[22] Filed: Mar. 21, 1995

[30]  Foreign Application Priority Data

Mar. 30, 1994 [DE] Germany ............................ 44 11 139.8

[51] Int. Cl.⁶ ...................................................... B02C 18/22
[52] U.S. Cl. ........................ 241/242; 53/349; 53/436.15; 241/285.3
[58] Field of Search ...................... 83/349, 436; 241/243, 241/285.2, 285.3, 222, 224, 225, 242

[56]  References Cited

U.S. PATENT DOCUMENTS

| | | | |
|---|---|---|---|
| 4,061,282 | 12/1977 | Walker et al. | 241/285.3 X |
| 5,313,864 | 5/1994 | Forgash et al. | |
| 5,435,050 | 7/1995 | Alt | 241/285.3 X |

FOREIGN PATENT DOCUMENTS

| | | | |
|---|---|---|---|
| 4236451 | 5/1994 | Germany . | |
| 656075 | 6/1986 | Switzerland | 241/285.3 |
| 2271741 | 4/1994 | United Kingdom . | |

*Primary Examiner*—Mark Rosenbaum
*Attorney, Agent, or Firm*—Banner & Witcoff, Ltd.

[57]  ABSTRACT

Apparatus for granulating strand materials including a stationary knife, a rotatable knife, and a drawing-in device. Part of the housing is pivotable to enable the drawing-in device to be easily removed for maintenance. An oblong hole on the housing is used to locate the drawing-in device.

3 Claims, 4 Drawing Sheets

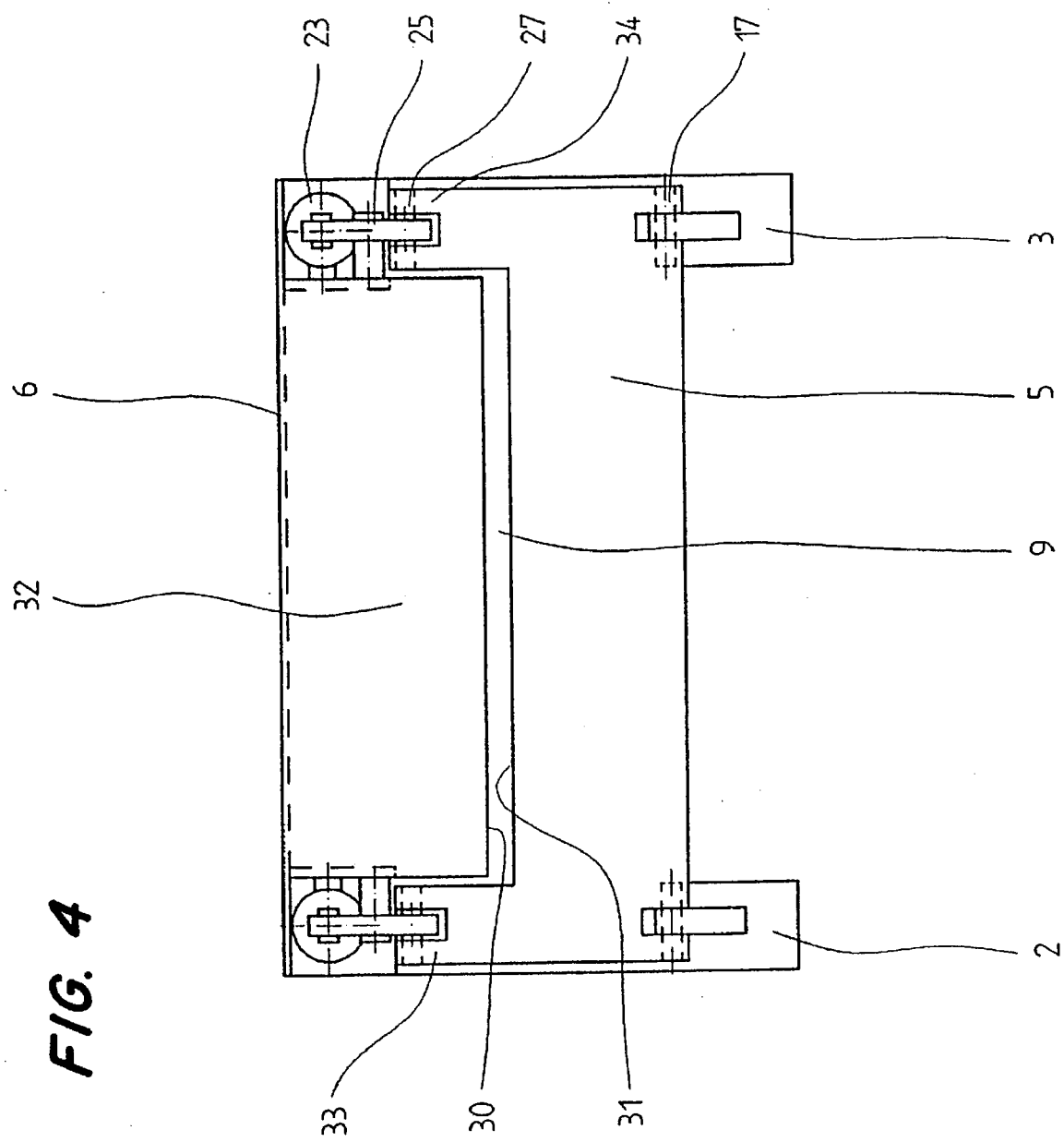

GRANULATING DEVICE FOR STRAND MATERIALS

DESCRIPTION

The invention relates to a granulating device for strand materials with a drawing-in device for gripping the strand material and transporting it to a stationary knife of a knife roll, cooperating with the stationary knife, for cutting up the strand material into granulate and with a lower and an upper drawing-in roll, forming the drawing-in device, of which rolls at least one is driveable, the rolls being held in two opposite side walls of a housing enclosing the granulating device, said housing comprising a hinged front flap on its front side.

Such a granulating device is described in DE-PS 42 36 451. In order, in the known granulating device, to permit good accessibility of the individual components of the granulating device for the purpose of cleaning, the lower drawing-in roll is—in contrast to the formerly required direct removal of the lower drawing-in roll from its operating position—movable between an operating position and a non-operating position, for which purpose a separate manipulating device is required. With the drawing-in roll in the non-operating position, said drawing-in roll largely frees up the space in the region of the stationary knife and the knife roll, with the result that said region, in which it is particularly easy for undesired materials to be deposited, is well accessible for cleaning. However, the positioning of the lower drawing-in roll in its non-operating position, which is in the vicinity of the operating position, frequently constitutes a hindrance to thorough cleaning.

SUMMARY OF THE INVENTION

The object of the invention is to further improve the accessibility of the interior space of the housing of the granulating device, this being of importance, for example, for the carrying-out of cleaning work, maintenance and repairs. The object of the invention is achieved in that the two side walls each comprise an oblong hole, open towards the front flap, for the guiding of bearings of the lower drawing-in roll, the end of said oblong hole forming a stop that defines the operating position of the lower drawing-in roll, the front flap—when during operation is in its closed position—pressing the bearings of the lower drawing-in roll against the stop through the intermediary of a supporting part.

Owing to the fact that the bearings of the lower drawing-in roll are disposed in the oblong hole, it is possible, in the case of cleaning, for the lower drawing-in roll to be withdrawn with its bearings from the stop defined by the end of the oblong hole, as a result of which the lower drawing-in roll is immediately disengaged from the region of the other rolls. The thus released lower drawing-in roll can then easily be removed from the oblong hole, which is open towards the front flap, for the purpose of which removal the front flap is hinged open. The interior space of the housing, in which merely the upper drawing-in roll, the stationary knife and the knife roll remain, is then easily accessible and all regions thereof can be thoroughly cleaned. The same applies to any required maintenance operations.

Advantageously, the front flap is of such design that it, together with a cover partially covering the front side of the granulating device, forms the termination of the front side and, by means of a pulling device articulatedly connected to the cover, is adapted to be pressed against the end faces of the side walls. Under the action of the pulling device; the front flap, together with the cover, is pressed against the housing and, in particular, against the end faces of the side walls, whereby the bearings of the lower drawing-in roll are simultaneously held in their stops.

It is advantageous for the oblong holes to extend more or less horizontally. In this case, the withdrawal and insertion of the bearings of the lower drawing-in roll requires only little effort, because there is no need to overcome the force of gravity. This is of advantage particularly when sliding the bearings into the oblong holes, since this requires only gentle pressure to be exerted on the bearings until the stop has been reached. It is possible in this manner, if appropriate, to bring into engagement conventionally used driving gearwheels, which, if the lower drawing-in roll were to be engaged under the influence of gravity, might possibly suffer damage as a result of rough handling.

BRIEF DESCRIPTION OF THE DRAWING

As an example an embodiment of the invention is represented in the drawings, in which:

FIG. 4 shows a front view of the granulating device.

DESCRIPTION OF THE PREFERRED EMBODIMENTS

Figure 1:
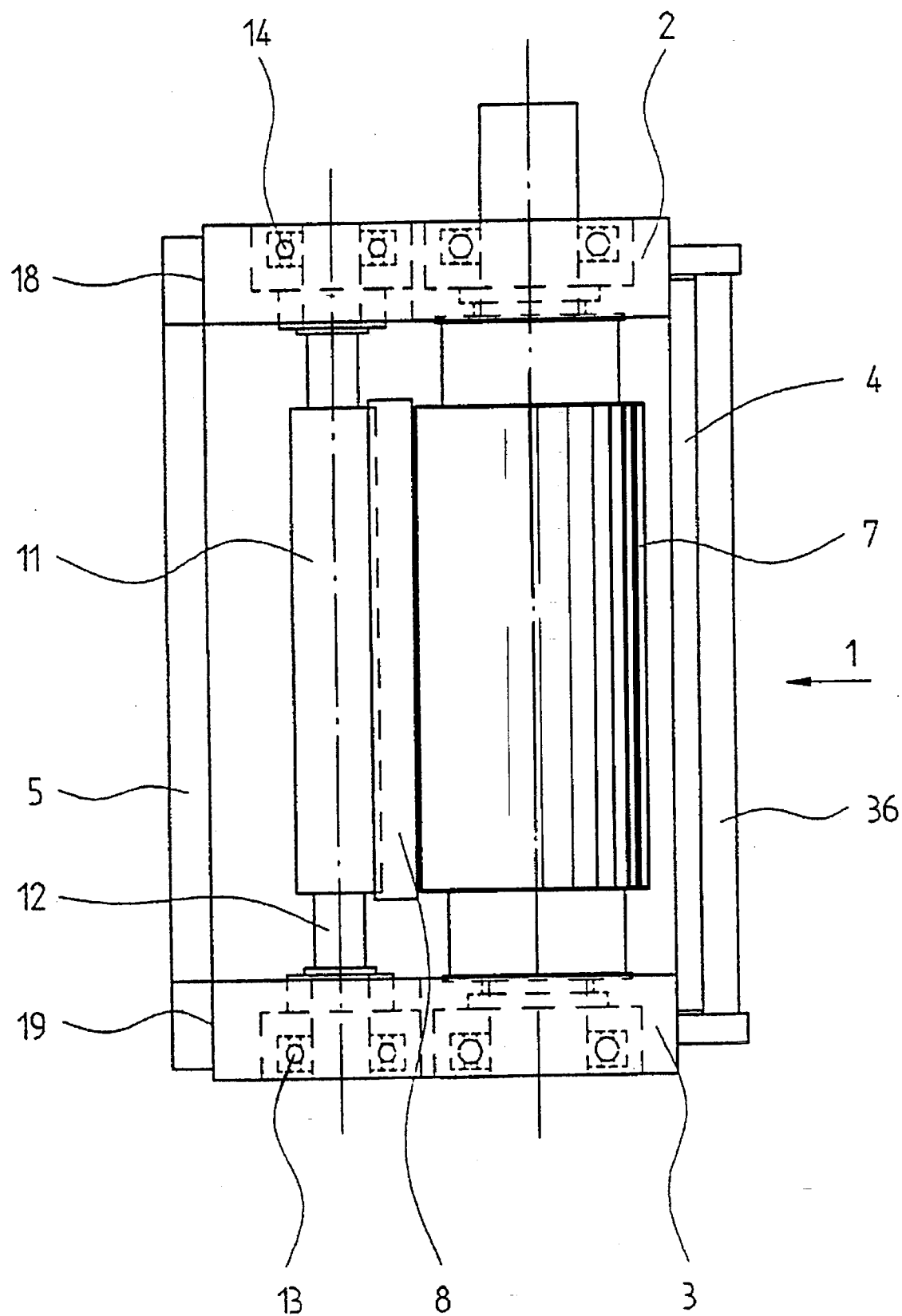
FIG. 1 shows the basic representation of a granulating device in a top view without cover and without upper drawing-in roll.
Figure 2:
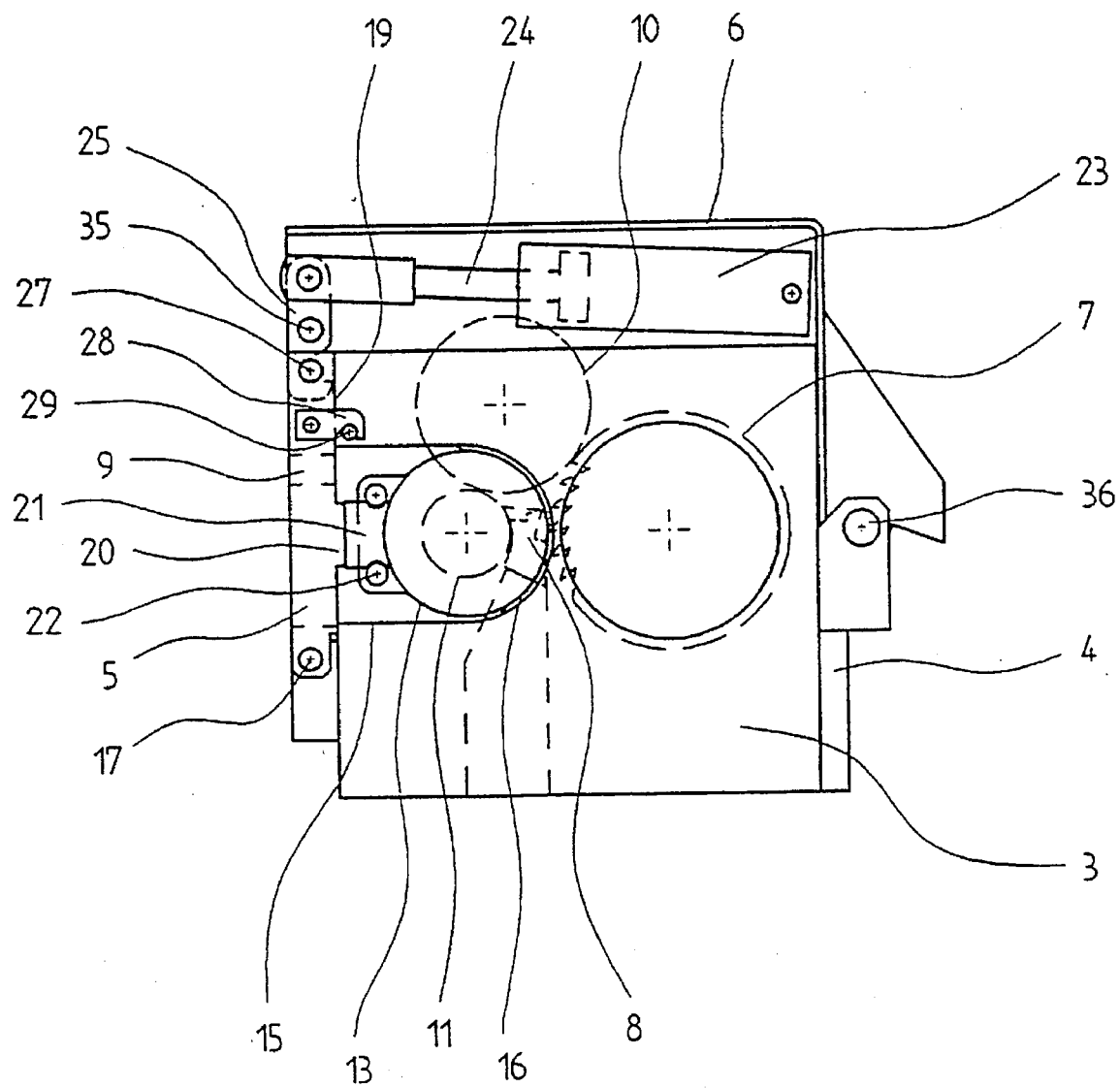
FIG. 2 shows the side view of the granulating device according to FIG. 1 with the oblong hole in one of the side walls, in the operating position.

FIG. 1 shows, in a basic representation, a granulating device which comprises a housing 1, of which the two side walls 2 and 3, the rear wall 4 and the front flap 5 are shown. In order dearly to show the parts of the granulating device that are accommodated between the two side walls 2 and 3, the cover 6 and the upper drawing-in roll 10 (which are shown in FIG. 2) have been omitted from FIG. 1. Held in conventional manner between the two side walls 2 and 3 is the knife roll 7, which cooperates with the stationary knife 8, over which strands (not shown) are guided that are fed into the granulating device. Between the envelope of the knife roll 7 and the stationary knife 8 there is a gap just a few $\frac{1}{100}$ mm wide, in order to guarantee a clean cut. For reasons of clarity of representation, said gap is drawn enlarged in FIG. 1. The strands are fed in through a slot 9 shown in FIG. 2 (said slot 9 being formed by the end faces 30 and 31 of the cover 6 and of the front flap 5 as identified in FIG. 3), from where the strands enter a drawing-in device consisting of the upper drawing-in roll 10 and the lower drawing-in roll 11. As can be seen from FIG. 2, the circumferences of the drawing-in rolls 10 and 11 are separated by a small gap, which serves in known manner to clampingly grip the strands that are being fed in. Both the upper drawing-in roll 10 and also the lower drawing-in roll 11 are held in the side walls 2 and 3.

The lower drawing-in roll 11 is seated by its journals 12 in the bearings 13 and 14, which are in the form of circular discs. The bearings 13 and 14 (see also FIG. 1) are displaceable in oblong holes in the side walls 2 and 3, of which oblong holes only the oblong hole 15 in the side wall 3 is shown on account of the side view in FIG. 2. The oblong hole 15 (and the corresponding oblong hole disposed in the side wall 2) terminates at its inner end 16 in a rounded section, which, in the operating position shown, snugly surrounds the bearing 13 (and, correspondingly, the bearing 14 in the side wall 2), with the result that the rounded section 16 forms a stop for the bearings 13 and 14.

In the operating position shown in FIG. 2, the bearings 13 and 14 are pressed into their stops, this being accomplished by means of the front flap 5, which connects the side walls 2 and 3 and is adapted to be hinged away therefrom. Provided for this purpose is the hinge axis 17, which is held in the two side walls 2 and 3. In the operating position shown, the front flap 5 is in contact with the end faces 18 and 19 of the two side walls 2 and 3. It presses by means of its projection 20 against the pressing part 21, which is attached with clearance to the bearing 13/14 by means of the pin 22. The pin 22 is connected to the bearing 13/14 in the interior space between the two side walls 2 and 3 by means of a plate (not shown), said plate being similar in circumference to the lower drawing-in roll 10 and partially covering the oblong holes 15 on the insides and being permanently connected to the bearing 13/14. With the front flap closed, therefore, the bearing 12/13 and thus the lower drawing-in roll 11 are pressed into their stops and held in the operating position.

The front flap 5 is pressed pneumatically against the end faces 18 and 19 of the two side walls 2 and 3 by means of the piston-cylinder unit 23. The piston-cylinder unit 23 is articulatedly connected on one of its sides to the cover 6. On its other side, it is attached through the intermediary of the piston rod 24 to the lever 25, which is swivelably held on the cover 6 through the intermediary of a centre pin 35. The lever 25 engages, with a recess 26, a pin 27 attached to the front flap 5, with the result that a pressure exerted on the piston rod 24 is transmitted via the lever 25 and the pin 27 to the front flap, thus pressing the latter against the end faces 18 and 19 of the two side walls 2 and 3. As explained hereinbefore, the bearing 13/14 is simultaneously pressed into its respective stop.

Figure 3:
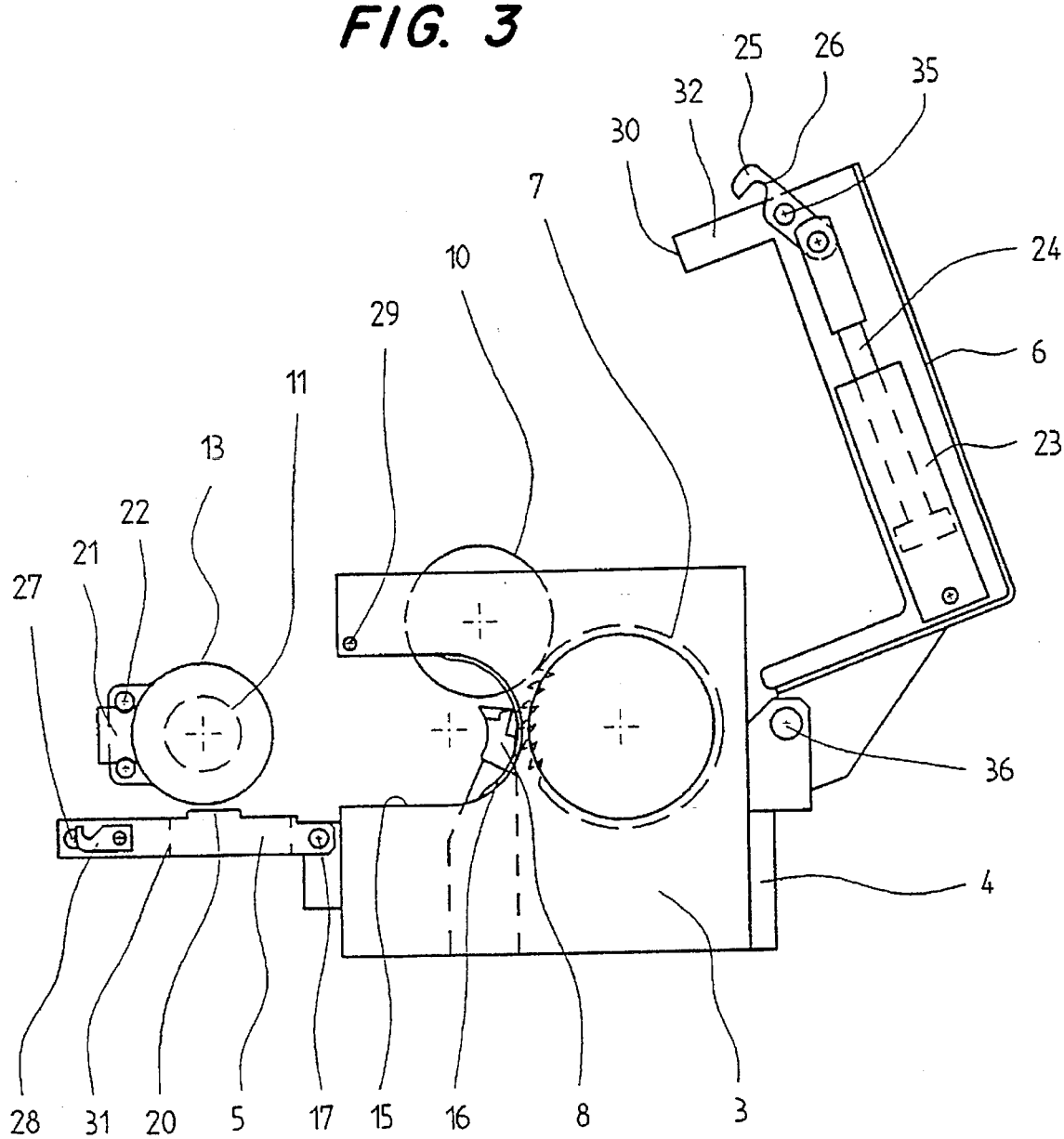
FIG. 3 shows the same arrangement in the non-operating position.

FIG. 3 shows the arrangement according to FIG. 2 in the open state, i.e. in the non-operating position. The cover 6 has been opened through rotation about the shaft 36 and the front flap 5 has been hinged away, for which purpose the connection between the recess 26 and the pin 27 has been released through retraction of the piston rod 24. In this position, the bearings 13 and 14 of the lower drawing-in roll can be slid out of the oblong holes 15 until the oblong holes 15 release the bearings 13 and 14, with the result that the lower drawing-in roll 11 can be removed with the components attached thereto, particularly the pressing part 21. With the granulating device in this position, the interior space is freely accessible for cleaning and maintenance.

In order to return the device to the operating position shown in FIG. 2, the front flap 5 is pressed manually against the end faces 18 and 19 of the two side walls 2 and 3. In addition, the cover 6 is hinged into the closed position, with the result that it assumes the position shown in FIG. 2. In this position, the lever 25 is swiveled, through operation of the piston-cylinder unit 23, until the recess 26 comes up against the pin 27. Provided in order to secure the front flap 5 is the swivelable hook 28, which is articulatedly connected to the front flap 5. The hook 28 engages behind the pin 29, which is attached to the side walls 2 and 3. Accordingly, two such hooks are disposed on either side of the side walls 2 and 3. The hook 28 serves—when the device is being closed—initially to hold the front flap 5 in its hinged-to position until, through the action of the piston-cylinder unit 23, the front flap 5 is then firmly pulled against the end faces 18 and 19 of the two side walls 2 and 3. Before the front flap 4 was hinged to, the lower drawing-in roll 11 had been re-inserted into the device, for which purpose the two bearings 13 and 14 had been slid into the oblong holes 15. When the front flap 5 is finally tightened by means of the piston-cylinder unit 23, the bearings 13 and 14 are then pressed into their respective stops through the intermediary of the projections 20 and the pressing parts 21, as a result of which the device is returned to its operating position.

FIG. 4 shows a front view of the granulating device in the operating position, i.e. with the cover 6 closed and the front flap 5 pressed on. FIG. 4 clearly shows the slot 9, through which the strands are fed into the granulating device. The slot is bounded on its long sides by the end faces 30 and 31 of the cover 6 and of the front flap 5. To this end, the cover 6 projects with its downward-extending apron 32 towards the slot 9 and is bounded at the sides by the extensions 31 and 34 of the front flap 5. The front flap is held on the hinge pins 17. FIG. 4 further shows the piston-cylinder unit 23, which actuates the lever 25 in the aforedescribed manner. The hook 28, described in conjunction with FIG. 3, and the pin 29 have been omitted in FIG. 4.

What is claimed is:

1. Granulating device for strand materials with a drawing-in device for gripping the strand material and transporting it to a stationary knife (8) and a knife roll (7), cooperating with the stationary knife (8), for cutting up the strand material into granulate and with a lower and an upper drawing-in roll (11, 10), forming the drawing-in device, of which rolls (11, 10) at least one is driveable, the rolls (7, 10, 11) while in their operating position being held in two opposite stationary side walls (2, 3) of a housing (1) enclosing the granulating device and covering the rolls with the side walls., said housing (1) comprising a hinged front flap (5) on its front side, characterized in that the two side walls (2, 3) each comprises an oblong hole (15) with an end which is closed and an end which opens toward the front flap (5), for the guiding of bearings (13, 14) of the lower drawing-in roll (11) which is freely movable in the open position of the front flap, the closed end (16) of said oblong hole (15) forming a stop that defines the operating position of the lower drawing-in roll (11), wherein the front flap (5) with a presses part (20), when in its closed operating position, pressing the bearings (13, 14) of the lower drawing-in roll (11) against the stop.

2. Granulating device according to claim 1, characterized in that the front flap (5), together with a cover (6) partially covering the front side of the granulating device, forms the termination of the front side and, by means of a pulling device (23, 24) articulatedly connected to the cover (6), is adapted to be pressed against end faces (18, 19) of the side walls (2, 3).

3. Granulating device according to claim 1 or 2, characterized in that the oblong hole (15) extends more or less horizontally.

* * * * *